United States Patent [19]

Blum et al.

[11] Patent Number: 5,022,808

[45] Date of Patent: Jun. 11, 1991

[54] STORING SYSTEM WITH A CONVEYING DEVICE

[76] Inventors: Albert Blum, Scheiderhöhe, 5204 Lohmar 1; Horst Tadday, Lüdenscheider Str. 31, 5974 Herscheid, both of Fed. Rep. of Germany

[21] Appl. No.: 477,969

[22] PCT Filed: Nov. 18, 1988

[86] PCT No.: PCT/DE88/00719
§ 371 Date: May 14, 1990
§ 102(e) Date: May 14, 1990

[87] PCT Pub. No.: WO89/04900
PCT Pub. Date: Jun. 1, 1989

[30] Foreign Application Priority Data

Nov. 19, 1987 [DE] Fed. Rep. of Germany ....... 3739158

[51] Int. Cl.$^5$ .......................... B65G 1/00; B25J 3/00
[52] U.S. Cl. .................................. 414/280; 414/260; 414/264; 414/286; 414/661
[58] Field of Search ............... 414/252, 253, 255, 257, 414/259, 260, 261, 277, 280, 286, 659, 661

[56] References Cited

U.S. PATENT DOCUMENTS

| 2,714,456 | 8/1955 | Manaugh | 414/264 X |
| 2,831,213 | 4/1958 | Klarmann et al. | 414/277 X |
| 2,994,445 | 8/1961 | Roth | 414/255 X |
| 4,007,846 | 2/1977 | Pipes | 414/280 X |
| 4,010,855 | 3/1977 | Smith | 414/286 X |
| 4,352,622 | 10/1982 | Wieschel | 414/661 X |
| 4,372,219 | 2/1983 | Gibbs | 414/286 X |
| 4,566,838 | 1/1986 | Binning et al. | 414/659 X |
| 4,656,949 | 4/1987 | Ragot | 414/280 X |
| 4,690,602 | 9/1987 | Castaldi et al. | 414/661 X |
| 4,718,810 | 1/1988 | Hoehn et al. | 414/280 X |
| 4,756,657 | 7/1988 | Kinney | 414/280 X |
| 4,768,914 | 9/1988 | Sing | 414/286 X |

FOREIGN PATENT DOCUMENTS

1224425 7/1987 Canada ................................. 414/661
1271368 6/1968 Fed. Rep. of Germany ...... 414/259

Primary Examiner—Robert J. Spar
Assistant Examiner—Robert S. Katz
Attorney, Agent, or Firm—Brooks & Kushman

[57] ABSTRACT

A storage system, in particular a multi-story car park, comprises a displaceable lift (10) resembling a tower and transport pallets (8) with a guide rail on their lower side. The pallets (8) are gripped by the transfer device (47) forming part of the lift (10), which transfers them from the roller rails (20) of the lift (10) to stationary roller rails (7) of the parking places.

35 Claims, 6 Drawing Sheets

STORING SYSTEM WITH A CONVEYING DEVICE

The invention relates to a storing system with a conveying device for conveying heavy objects placed in an entry point to depositing spaces arranged in at least one tier above and adjacent to each other and from the respective depositing space to an exit point, in particular in a multi-storey car park for the automatic parking and unparking of vehicles, with a lift system consisting of at least one tower-like frame which extends over the entire height of the storing system and can be moved along a horizontal guide, a receiving device arranged in the tower-like frame and capable of being moved up and down along a vertical guide, two roller rails, running parallel to each other, arranged on opposite sides in the receiving device and lying perpendicular to the horizontal guide of the tower-like frame, as well as stationary roller rails arranged in the individual depositing spaces and with which the roller rails of the receiving device can be aligned.

In a known storing system which is designed for multi-storey car parks, a hydraulically actuatable lifting platform is provided. A separate transporting wagon is arranged on this platform and can be moved horizontally. The vehicles parked in an entry point are drawn using a transfer device onto the transporting wagon which is then conveyed using the lifting platform in a vertical direction to the intended level in each case. Once it has reached the intended level, the transporting wagon is freed from the lifting platform and moved in a horizontal direction to the respective depositing space where the vehicle is pushed from the transporting wagon into its respective space. The construction of this known parking system is extremely expensive and a considerable amount of time is required for each individual parking and unparking operation.

A storing system of the type mentioned at the beginning is further known (DE-OS 1,811,635), which serves for loading and unloading sets of shelves using receiving troughs. The loading and unloading takes place using a chain drive, which can be driven in both directions and which can be coupled to the receiving troughs via swivel hooks. Such a storing system is suitable only for a simple stored material, for example iron bars.

The object of the invention is to provide a storing system which can accommodate even large and sensitive objects with a high degree of accuracy and reliability and enables a rapid loading and reception at a small cost.

According to the invention, this object is achieved in that movable transport pallets for carrying the objects to be stored are guided on the roller rails, in that at least one transfer device is arranged on the receiving device between the roller rails to move the respective transport pallet during transfer and to secure the transport pallet during the conveying on the receiving device, in that at least on the underside of each transport pallet approximately centrally and running in its longitudinal direction, a guide rail is fastened, the part of which points downwards, and in that gripping wheels belonging to the transfer device are arranged on both sides of the guide part, can be applied against opposite sides of the guide part and lifted off from the latter again, and can be selectively driven and immobilized together.

In the storing system according to the invention, it is possible to transport the objects to be stored from different entry points to any desired depositing space and subsequently to different exit points. It is also readily possible to carry out a rearrangement of the objects from one depositing space to another depositing space. Both the horizontal and the vertical transporting movements are carried out with a single frame which can have a very simple construction. By superposing the horizontal conveying movement and the vertical conveying movement, the objects can be conveyed within the storing system by the shortest direct route from space to space. Since the objects are conveyed on transport pallets, on which they remain in the depositing spaces as well, it is possible to have a very simple structural system. The depositing spaces do not need any fixed support floors, rather a system consisting of individual support rails, which may be part of a support structure, is sufficient. The transfer of a transport pallet from the receiving device into the respective depositing space, or vice versa, is especially simple using the gripping wheels which can be applied against the guide rail of the transport pallet. In the immobilized state, the gripping wheels serve simultaneously as a brake and secure the transport pallet during the passage from one depositing space to another.

The gripping wheels are advantageously seated on a holding system displaceable in the longitudinal direction of the receiving device.

The holding system can be displaced via a spindle-driven cylinder device arranged on the receiving device below the plane of the transport pallet.

The gripping wheels which lie opposite each other are each advantageously mounted on a swivel lever device which is seated on the holding system. The swivel lever devices of the two opposite gripping wheels can be connected in this case via two further connecting levers to a double knuckle joint, a common locking drive resulting between the bearing point of the two connecting levers and the holding system. A spindle-driven cylinder device may be provided as the locking drive.

In order to achieve a low-noise and smooth working of the conveying device, the gripping wheels may be rubber-tyred.

In a storing system in which the depositing spaces are accommodated in two opposite vertical planes and the conveying device is arranged between the two planes, the receiving device may have a separate transfer device for each of the depositing spaces arranged on opposite sides so that the respective transport pallets can be selectively conveyed to one or other side. At the same time, transport pallets from opposite sides may selectively be put onto the receiving device.

The construction according to the invention may be used for all storing systems, in particular for the so-called chaotic storing systems, whenever relatively heavy elements are to be stored in store rooms. The storing system according to the invention is also readily applicable to multi-storey car parks.

With multi-storey car parks, there is, however, the peculiar requirement that the free spaces, especially on the drive-in and drive-out tier, should where possible always be provided with a pallet in order to prevent accidents and damage to motor vehicles. To this end, a second pair of roller rails can arranged on the receiving device guided in the tower-like frame, at a vertical distance from the already described roller rails, for supporting a replacement transport pallet which, after a transport pallet occupied by a motor vehicle has been removed, is put into its place. The replacement transport pallet has the same features as the other transport pallets.

The transfer device is preferably arranged between the pairs of roller rails lying above each other and can thus be used for the selective transfer of both transport pallets.

A further guide rail, the guide part of which points upwards, is also advantageously provided on the upper side of at least the lower transport pallet centrally and parallel to the guide rail provided on the underside, the transfer device having two further, lower-lying gripping wheels which are seated on the same axles as the upper gripping wheels and can be applied against both sides of the upward-facing guide part of the upper guide rail of the respective lower transport pallet. In this respect, the drive system is designed according to the same plan for moving and securing the two pallets without any particular extra expenditure.

The gripping wheels may be selectively coupled to and uncoupled from the drivable shafts via couplings.

An alternative embodiment can be characterized in that the vertical distance between the upper pair of gripping wheels and the lower pair of gripping wheels is shorter than the vertical distance between the lower guide rail of the upper support pallet and the upper guide rail of the lower support pallet and in that the swivel lever devices on both sides can be raised or lowered for coupling to the respective guide rails.

For this purpose, the swivel lever devices are preferably guided vertically displaceably with the gripping wheels in the holding system and their height can be adjusted by means of a lifting drive. A cushion-type cylinder is advantageously provided as the lifting drive.

It is especially advantageous if the transport pallets have guide rails on both their upper side and on their underside. It is thus possible to insert the transport pallets selectively as either an upper or a lower pallet, as required.

The invention is illustrated in the drawing by way of example and described below in detail with reference to the drawing, in which.

According to FIGS. 1 to 3 of the drawing, a multi-storey car park 1 is equipped with a storing system which has depositing spaces 3 for vehicles 4 in several levels above and below the street level 2. The depositing spaces 3 are arranged above and next to each other in two opposite vertical tiers 5 and 6.

The interior of the multi-storey car park does not need to be divided into supporting partition floors. A steel structure is sufficient which provides two stationary roller rails 7 for each individual depositing space 3. The roller rails 7 serve to receive transport pallets 8, on each of which a vehicle 4 can be deposited and transported.

A system having one or more lifts 9, which can move between the two vertical rows 5 and 6 of depositing spaces 3, serves to transport the loaded or unloaded transport pallets 8.

Figure 2:
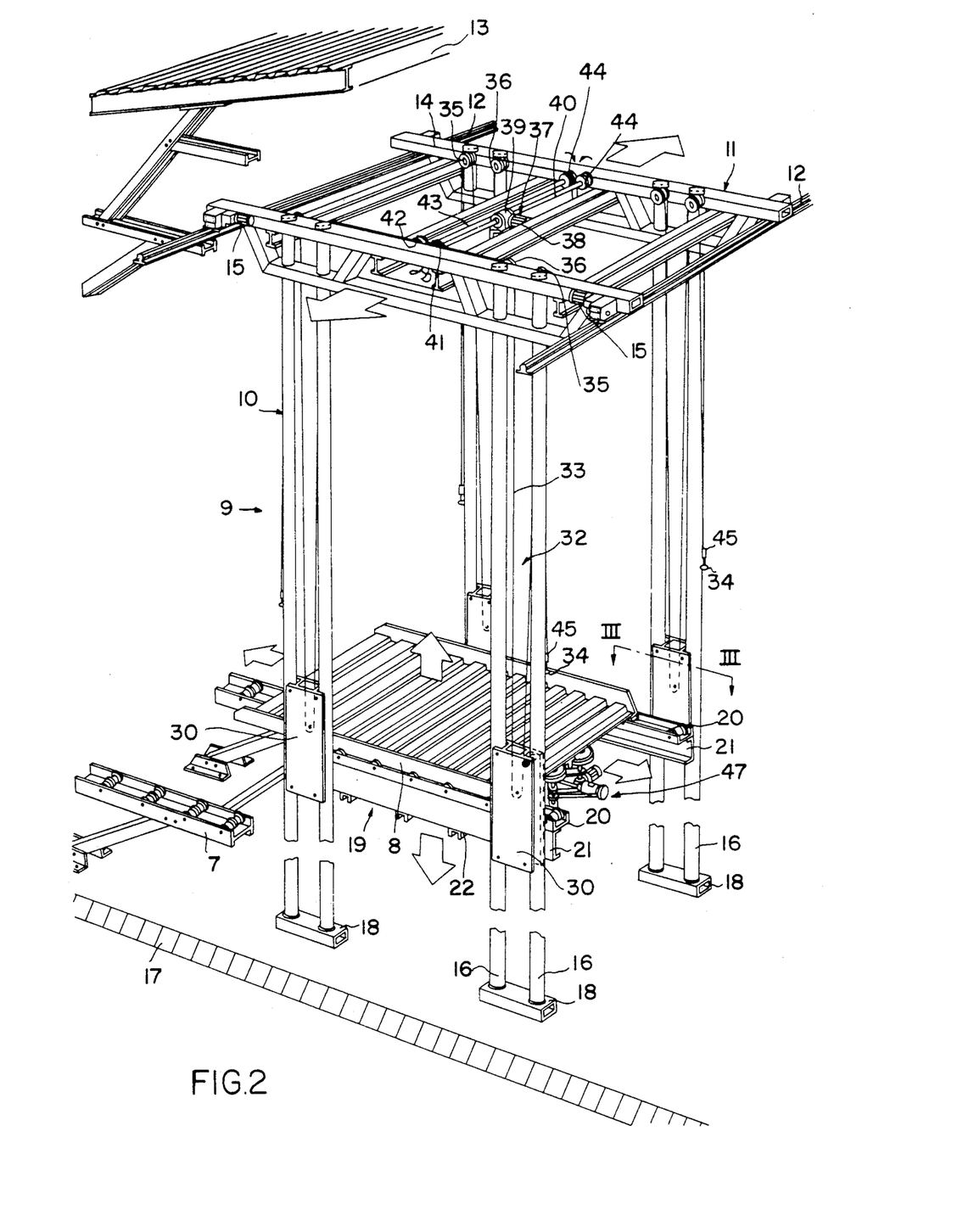
FIG. 2 shows the conveying device in an enlarged representation.

The lift 9 is shown in detail in particular in FIG. 2. This lift essentially consists of a tower-like frame 10 which extends over the entire height of the multi-storey car park and can reach both the top-most and the bottom-most depositing spaces.

The tower-like frame 10 is arranged suspended from a crab 11 which is guided on support rails 12. The support rails 12 run at a short distance below the roof 13 of the multi-storey ca park 1 so that the entire height of the multi-storey car park can be stacked with depositing spaces 3 arranged in a closely-packed manner.

The crab 11 consists of a rectangular rigid support frame 14 which is supported at its four corners on the support rails 12 via running wheels. The running wheels, which are not shown in detail in the drawing, can be driven via electromotors 15 in a synchronized manner.

Guide columns 16 are fastened to the support frame 14 of the crab 11 at the four corners inside the support rails 12 and hang perpendicularly downwards and extend to near the floor 17 of the multi-storey car park 1. The guide columns 16 are each arranged in pairs, to be more precise in planes which lie transverse to the direction of travel of the crab 11. The lower ends of the guide columns 16 of each pair of columns are joined together by crosspieces 18.

A receiving device 19 is mounted on the vertical guide columns 16 so as to be capable of moving up and down. The receiving device 19 essentially consists of two roller rails 20 which are arranged perpendicular to the horizontal direction of movement of the crab and serve to receive a transport pallet 8. The two roller rails 20 are each fastened to the upper limb of a U-beam 21, which beams are connected rigidly together via cross webs 22.

Guide rollers, which are not shown in more detail, serve to guide the receiving device 19 on the vertical guide columns 16.

The guide rollers of each individual roller guide are seated on a common support mounting 30 which is fastened laterally to the receiving device 19.

Each of the support mountings 30 serves simultaneously for housing a loose pulley 31 for a block and tackle-like lifting mechanism for raising and lowering the receiving device 19.

The four lifting mechanisms are designed in the illustrative embodiment shown in the drawing as chain block and tackle systems 32. The chains 33 are seated at lateral fastening points 34 to each of the outer vertical guide columns 16, run upwards from there via a fixed pulley 35, are deflected there by 180° and run to the respective loose pulley 31 which is housed on the respective support mounting 30, and from there upwards again to a second fixed electromagnetically braked pulley 36, from where the chain 33 is deflected into the horizontal and led to the center of the support frame 14 of the crab 11. A common drive 37 for all four chains 33 is provided in the central area of the support frame 14. The drive 37 consists of an electromotor 38 which transmits its speed via a worm gear 39 to a shaft 40. As shown in FIG. 2, the shaft 40 is provided at a short distance from its left end with a gearwheel 41 which meshes with a gearwheel 42 of a parallel shaft 43.

The two shafts 40 and 43 are provided at their outer ends with a total of four chain wheels 44 which drive the four chains 33 of the block and tackle systems. Complete synchronization is ensured by the common drive 37.

In order to adjust the four chains 33 during the installation of the structure and to reset them after a certain time, tensioning screws 45, with which the absolute length of the chain can be reset, are provided at the four fastening points 34 of the chains.

Alternatively it would, of course, also be possible to provide ropes instead of the chains 33, the chain pulleys then each having to be designed as rope pulleys.

By actuation of the common drive 37 of the lifting drives, the receiving device 19 may be moved up and down in the lift 9 and furthermore also simultaneously even during a horizontal movement of the lift 9. The pallets 8 can therefore be moved directly to each parking space by the shortest route.

When the roller rails 20 of the receiving device 19 are aligned flush with the stationary roller rails 7 of the individual depositing spaces 3, a transport pallet 8 located in the lift can in each case be inserted into a depositing space 3 or a transport pallet can be moved from a depositing space onto the receiving device 19 of the lift.

Two transfer devices 46 and 47, which are fastened rigidly to the receiving device 19 of the lift, serve to drive the transport pallets 8. The right-hand transfer device 47 serves to displace a transport pallet 8 from the receiving device 19 of the lift into a depositing space lying on the right-hand side and to displace a transport pallet from this depositing space onto the receiving device. The transfer device 46 arranged on the left-hand side serves for dealing with the depositing spaces situated on the left-hand side.

Each of the transport pallets 8 has, on its underside centrally in its direction of displacement, a guide rail 48 with a T-beam shape in cross-section, the guide part 49 of which, a free web, points downwards and serves as a friction surface for two rubber-tyred gripping wheels 50 and 51 respectively arranged on opposite sides of the web. The gripping wheels 50 and 51 belonging to the respective transfer device can be selectively driven and immobilized. In the immobilized state, they serve to secure a transport pallet 8 on the receiving device 19 of the lift and in the driven state they convey a transport pallet 8 into a depositing space or from a depositing space onto the receiving device 19.

So that the gripping wheels 50 and 51 can reach the pallets in the depositing spaces, they are fastened to a holding system 52 mounted displaceably in the longitudinal direction of the receiving device 19. The holding system 52 can be pushed forwards and backwards via a spindle-driven cylinder device 53 which can be actuated electrically and is arranged on the receiving device 19 below the plane of the transport pallet 8. The spindle-driven cylinder device 53 essentially consists of an electromotor 54 which pushes a con-rod 57 backwards and forwards via a chain drive 55 and a ball screw arranged in a cylinder 56. The cylinder 56 is held between two I-beams 58 which are in turn fastened to the cross webs 22 of the receiving device 19.

The holding system 52 for the gripping wheels 50 and 51 is seated on the end of the con-rod 57. So that the projecting weight of the spindle-driven cylinder device 53 can be borne even in the extended state of the transfer devices 46 and 47 respectively, three or more guide tubes 59, arranged at identical angular intervals around the con-rod 57, are provided as additional holding devices and are fastened on the one hand to the holding system 52 and on the other hand are led through guide bushes 60 to the hub flange 61 of the cylinder 56.

The guide tubes of the transfer device 47 are aligned exactly with the corresponding guide tubes of the transfer device 46 so that the respective aligned guide tubes 59 can be connected via guide rods 62 which are inserted telescopically into the guide tubes 59. Inside the guide tubes 59, the guide rods 62 bear against helical pressure springs which are not shown in the drawing so that a stable mounting for the relatively long guide tubes 59 is afforded in each operating state.

The holding system 52 of the two transfer devices 46 and 47 respectively consists of a thick-walled block 63 in which two vertical axles 64 are housed. Upper swivel levers 65 and 66 respectively and lower swivel levers 67 and 68 respectively are seated in a symmetrical arrangement on the lower and upper ends of the axles 64. The two swivel levers 65 and 67 carry the vertical axle 69 of one gripping wheel 50 and the swivel levers 66 and 68 the axle 70 of the other gripping wheel 51. Electric geared motors 71 for driving the gripping wheels 50 and 51 are arranged in each case on the lower swivel levers 67 and 68.

Limbs 72 and 73 respectively, whose averted ends are articulated on a spindle-driven cylinder device 74, are hinged with the axles 70 and 71 of the gripping wheels 50 and 51 respectively. The con-rod 75 of the spindle-driven cylinder device 74 engages centrally on the front of the block 63 of the holding system 52. By actuating the spindle-driven cylinder device 74, the gripping wheels 50 and 51 can therefore be pressed against the web 49 of the T-rail 48 or lifted off the same.

The limbs 72 and 73 are designed in their central region as turnbuckles so that the opening travel of the gripping wheels 50 and 51 can be set and reset as desired after a certain time.

Therefore when the lift is to collect a vehicle situated in a depositing space on a transport pallet 8, the roller rails 20 of the receiving device 19 of the lift 9 are aligned flush with the corresponding stationary roller rails 7 of the respective depositing space. The respective transfer device 46 or 47 then moves forwards by the actuation of the spindle-driven cylinder device 53, while the gripping wheels 50 and 51 are moved apart a little. In the extended state of the transfer device, the gripping wheels 50 and 51 move together by the actuation of the spindle-driven cylinder device 74 and the wheels are simultaneously driven by the actuation of the geared motors 71, the respective transport pallet 8 moving towards the receiving device 19 of the lift 9. By an opposing actuation of the spindle-driven cylinder device 53, the transfer device 47 is simultaneously returned into its retracted position. When the transport pallet 8 has reached its final position in the receiving device 19, the rotational movement of the gripping wheels 50 and 51 is halted, while the pressure of the gripping wheels applied to the web 49 of the T-rail continues to be maintained so that the transfer pallet 8 is held secure on the receiving device 19. For additional support, the gripping wheels of the second transfer device 46 can also be brought into firm engagement with the web 49.

The unloading of the transport pallet 8 from the receiving device 19 of the lift into a depositing space takes place in the exact opposite manner.

Figure 1:
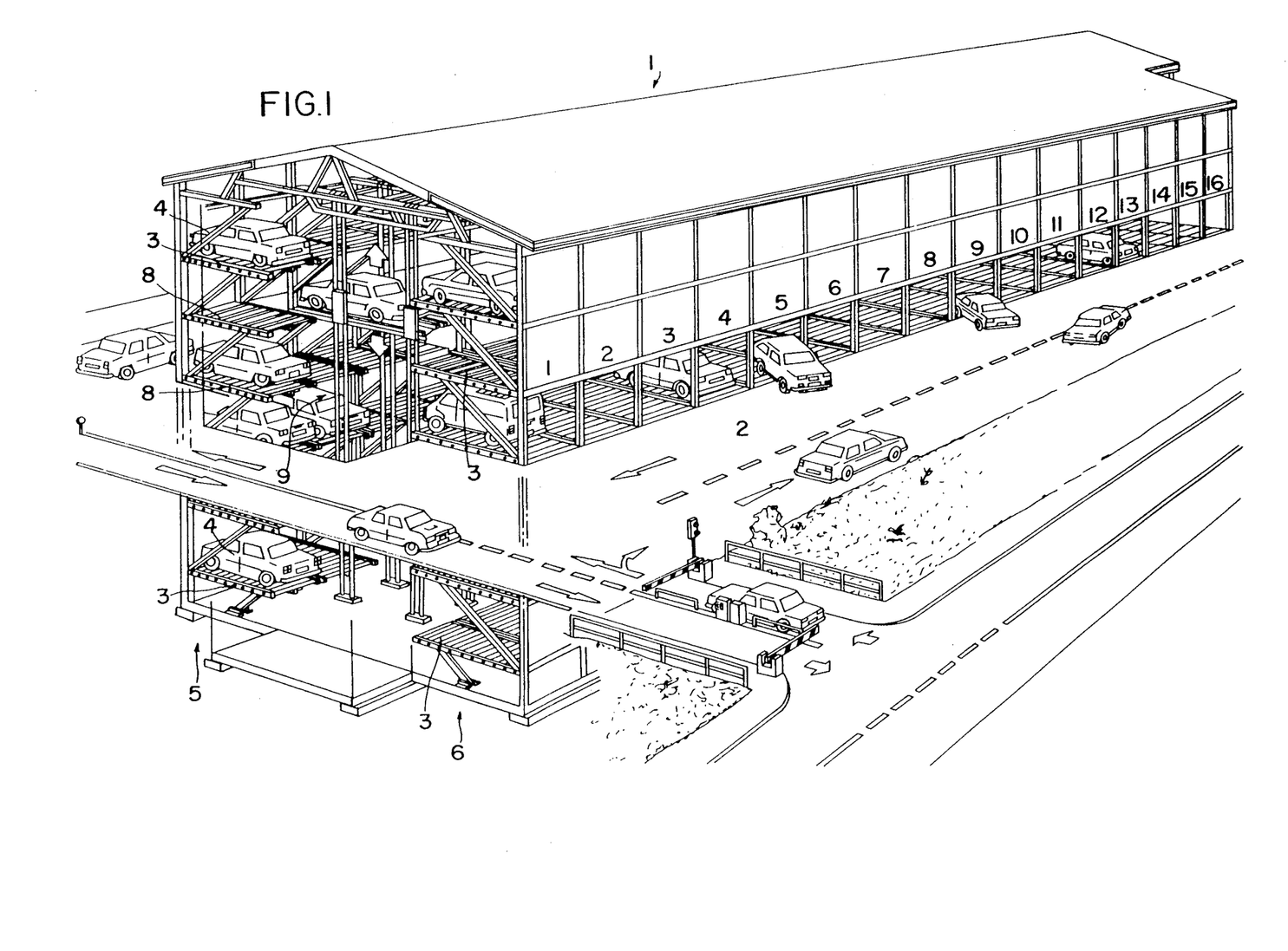
FIG. 1 shows a multi-storey car park, in partial section, which has an automatic storing system with a conveying device.
Figure 3:
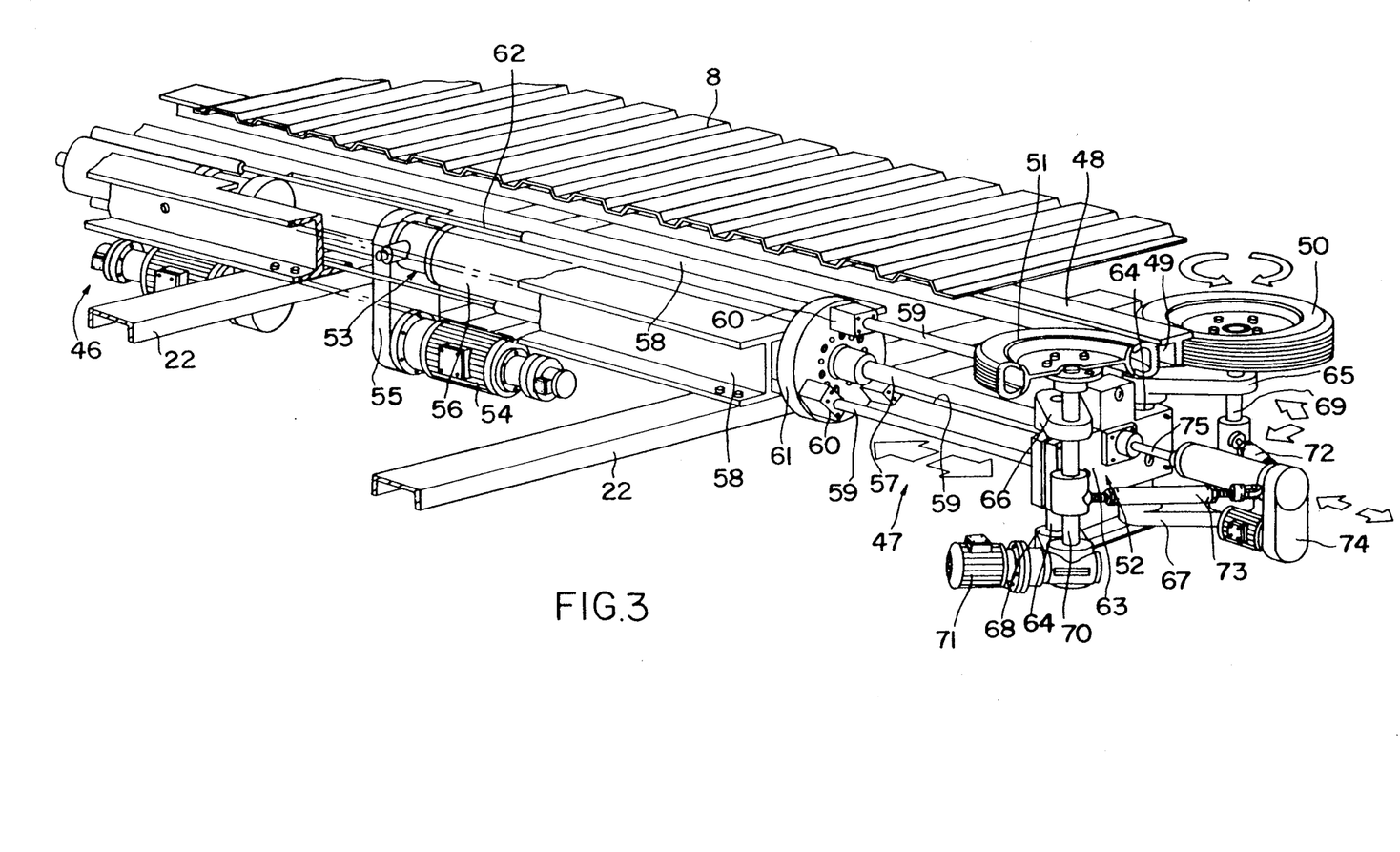
FIG. 3 shows a section of the receiving device shown in FIG. 2 in an enlarged representation.

The above-described construction shown in FIGS. 1 to 3 is equally suitable both for any type of storing systems for the storage of relatively large objects and for multi-storey car parks.

Figure 4:
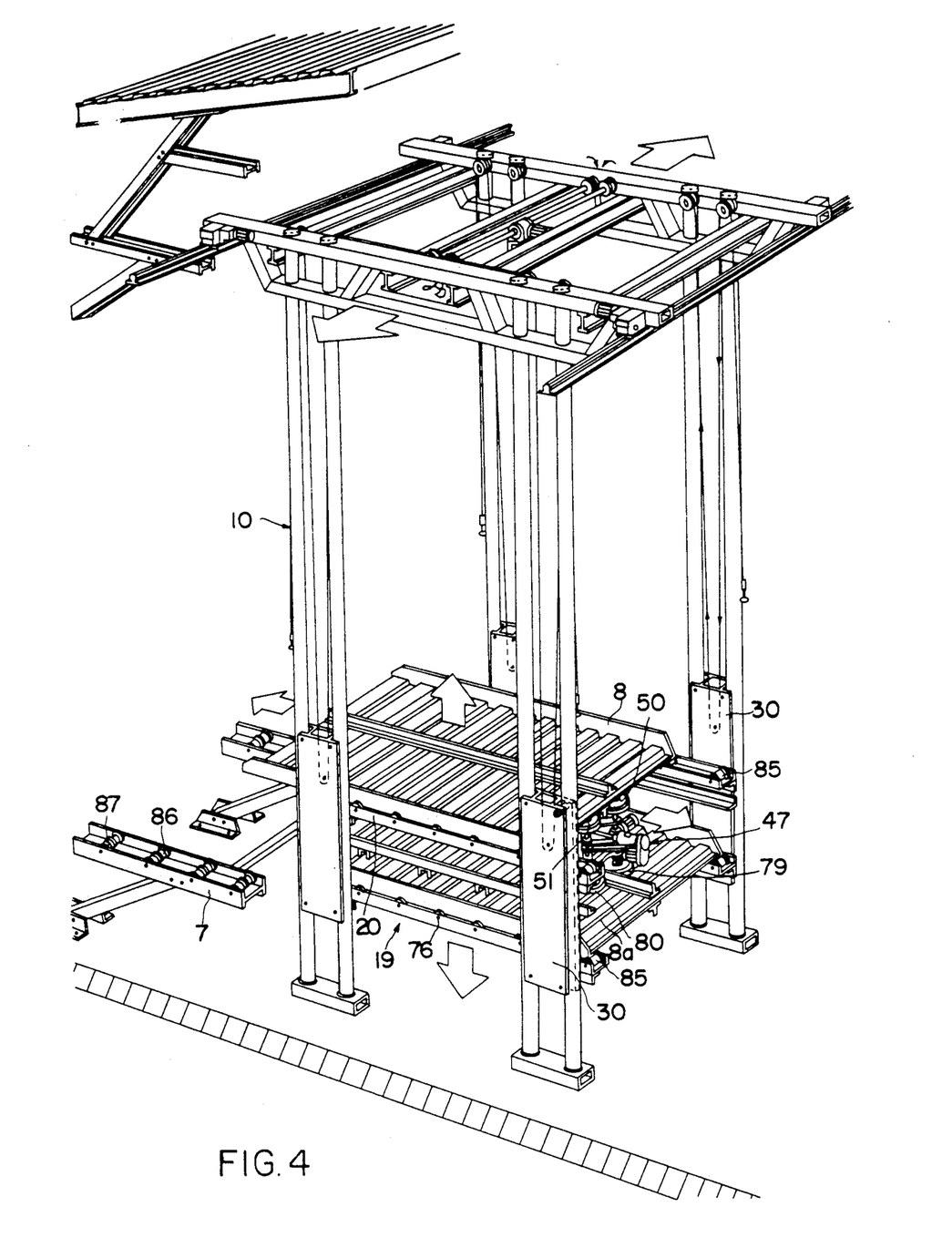
FIG. 4 shows a similar representation as in FIG. 2 but of an alternative embodiment.
Figure 5:
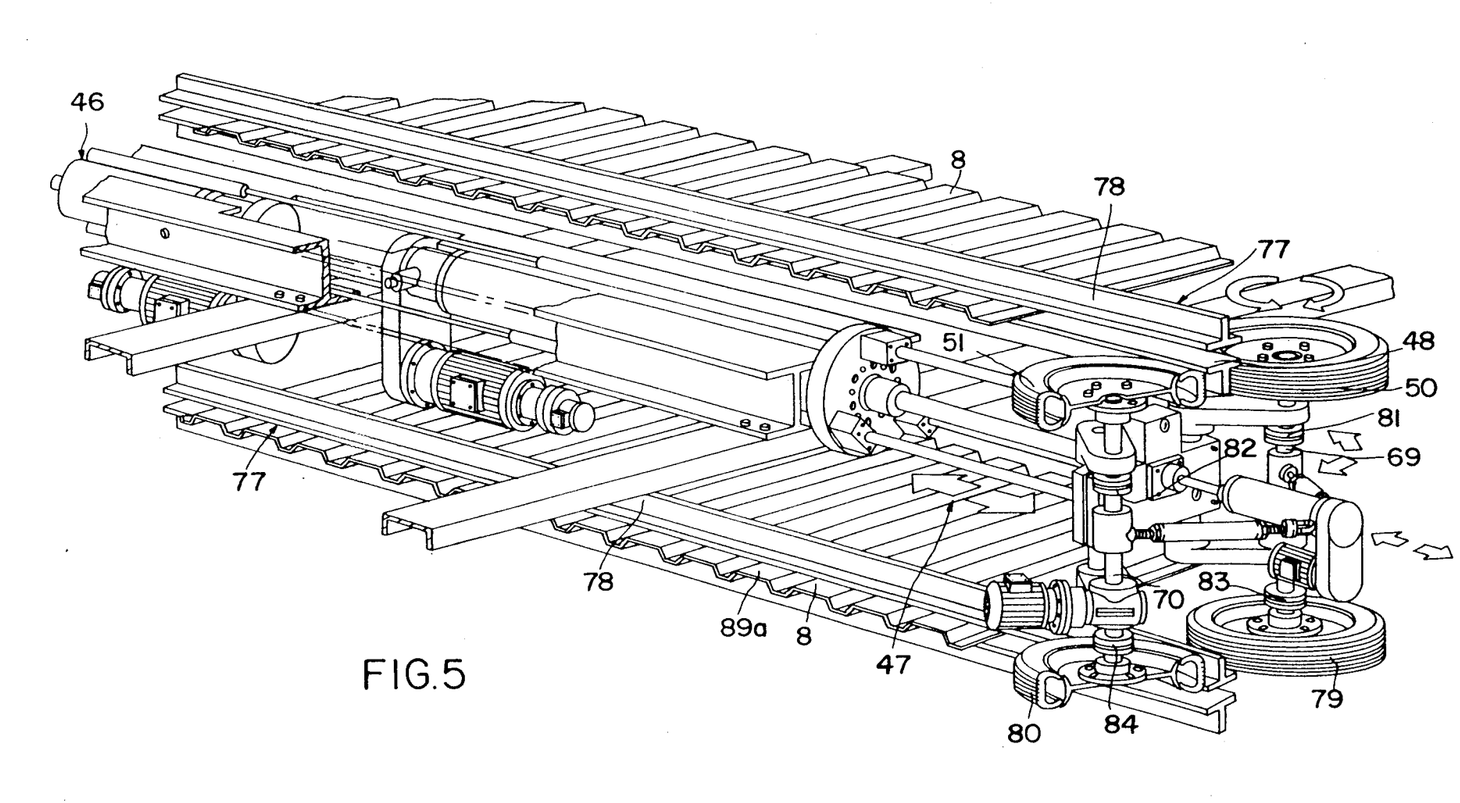
FIG. 5 shows a section of the receiving device shown in FIG. 4 in an enlarged representation and FIG. 6 shows a similar representation as in FIG. 2 of a further embodiment.

The modified embodiment shown in FIGS. 4 and 5 has been designed especially for multi-storey car parks. In what follows, essentially those features which differ from the embodiment shown in FIGS. 1 to 3 have been described. For the sake of clarity, identical elements have been referenced with identical positional numerals.

Just as in the first illustrative embodiment, a tower-like frame 10 is also provided here which corresponds in all details to the frame shown in FIGS. 1 to 3. Only the receiving device 19 and the transfer devices 46 and 47 show any differences.

First of all, two further roller rails 76, which are fastened laterally to the support mountings 30 at a distance below the roller rails 20, are additionally arranged on the four support mountings 30. The lower roller rails 76 serve to receive a replacement transport pallet 8a which, as soon as a transport pallet occupied by a motor vehicle has been withdrawn from a depositing space, can be inserted into the empty space which is left.

Transfer devices 46 and 47, which are approximately identical to the transfer devices described in FIGS. 1 to 3, serve for selectively displacing and securing the pallets 8 and 8a.

The transfer devices 46 and 47 shown in FIGS. 4 and 5 have in addition to the upper gripping wheels 50 and 51 two lower-lying gripping wheels 79 and 80 which are seated on the same axles 69 and 70 as the upper gripping wheels. In this illustrative embodiment, however, the upper and lower pairs of gripping wheels may selectively be uncoupled from the driven shafts 69 and 70, specifically by electro-magnetically actuatable couplings 80 and 81 and 83 and 84 respectively. It is thus possible to actuate either the upper transport pallet 8 or the lower replacement transport pallet 8a.

Both transport pallets 8 and 8a have, on their upper side centrally and parallel to the T-rail 48 provided on the underside, a further T-rail 77, the free web 78 of which points upwards. The lower gripping wheels 79 and 80 bear against this web 78 when the transport pallet lies on the lower roller rails 76 as a replacement pallet.

In order to collect a motor vehicle which has been driven into a corresponding parking space in the entry level, the tower-like frame 10, loaded only with a replacement transport pallet 8a, moves to the corresponding depositing space, the upper roller rails 20 being brought into alignment with the corresponding roller rails 7 of the depositing space. After the transport pallet 8 with the vehicle situated on it has been drawn into the receiving device 19, the receiving device 19 moves a little upwards until the lower roller rails 76 are flush with the roller rails 7 of the depositing space. The replacement transport pallet is then pushed into the free depositing space so that the resulting free space is immediately covered again and another vehicle can drive in.

The lift then moves to a free depositing space in which the vehicle is to be deposited. To do this, the lower roller rails 76 are first aligned with the roller rails 7 of the depositing space so that the transport pallet situated there can be drawn into the receiving device 19 as replacement transport pallet 8a. The receiving device 19 is then lowered a little until the upper roller rails 20 are aligned with the roller rails 7 so that the transport pallet 8 loaded with the vehicle can be pushed onto the now free roller rails 7. The lift is then prepared for another removal operation.

Whilst only one row of rollers is arranged in each of the roller rails 20 and 76 of the receiving device 19, two rollers 86 and 87 are mounted rotatably relative to each other in each of the roller rails 7 of the individual depositing spaces. In this way only half the number of roller rails 7 are needed for the depositing spaces since one roller rail 7 can be used in each case for two adjacent depositing spaces.

Figure 6:
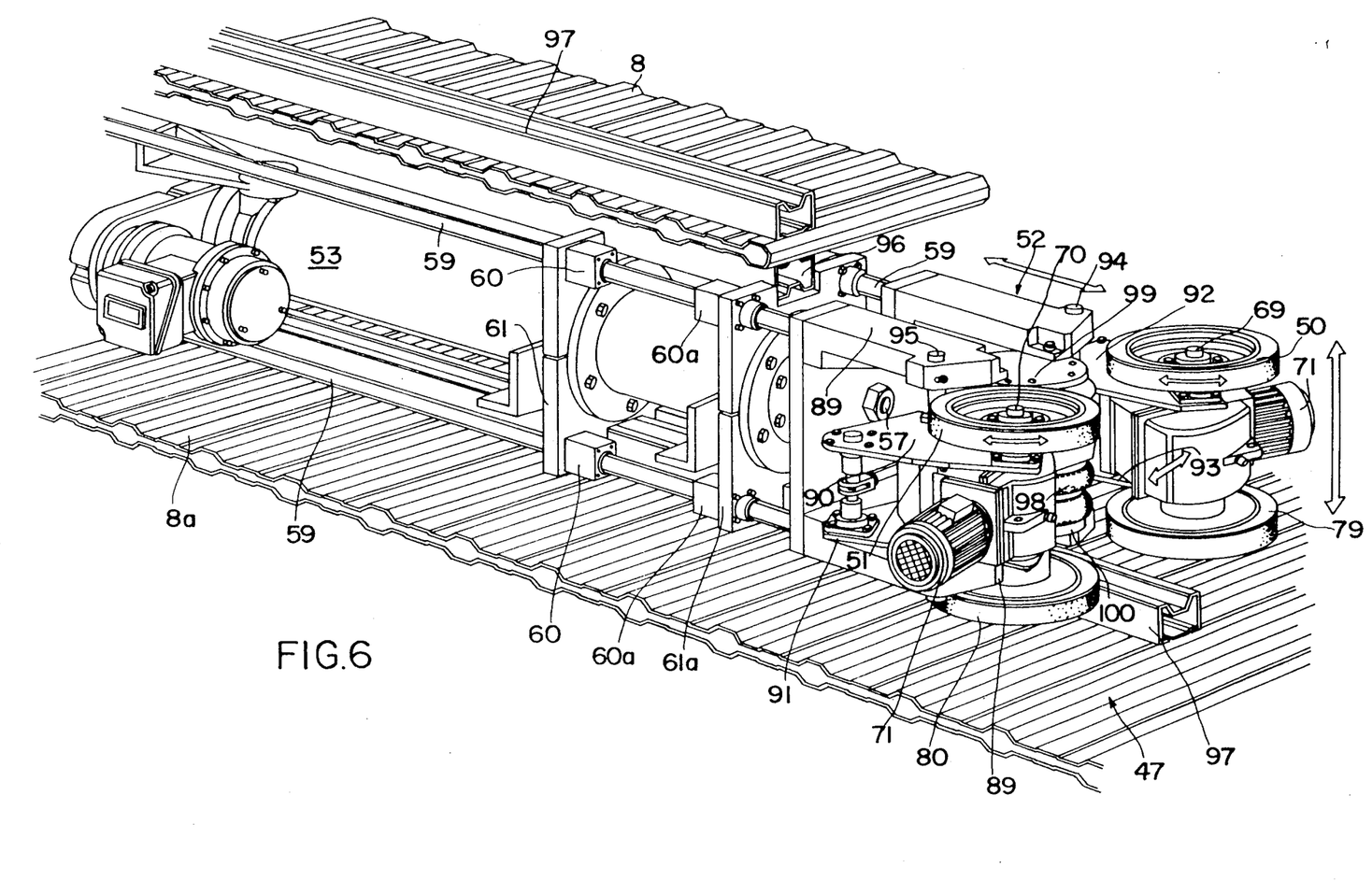

The embodiment shown in FIG. 6 is a variant of the illustrative embodiment shown in FIG. 5. For reasons of greater clarity, the same positional numerals have been used for all identical or equivalent elements as in the previous illustrative embodiments.

In the embodiment corresponding to FIG. 6, both the transfer device 47 shown on the right-hand side of the drawing and the transfer device 46 arranged on the opposite side and not shown in the drawing are selected for handling in each case two pallets, namely for an upper pallet 8, on which for example a motor vehicle is deposited, as well as for a lower replacement pallet 8a.

A spindle-driven cylinder device 53, the con-rod 57 of which is connected to the holding system 52, again serves to drive the respective transfer device. The holding system 52 consists of an approximately square support plate 88, to which four bracket arms 89, arranged parallel to the con-rod 57, are rigidly fastened. The support plate 88 is guided by four guide tubes 59 which run in guide bushes 60 and 60a. Two guide bushes 60 and 60a are assigned hereby for each guide tube 59 so that a very stable guide is created for the holding system 52.

The two pairs of gripping wheels 50 and 51 and 79 and 80 respectively are each seated on opposite swivel plates 90 to 93. The swivel plates 92 and 93 arranged on the right-hand side are mounted via a common vertical swivel axle 94 which is fastened between the two right-hand bracket arms 89, while the two left-hand swivel plates 90 and 91 are seated on a common swivel axle 95 which is fastened between the two left-hand bracket arms 89. Each of the pairs of swivel plates connected to each other carry the axles 69 and 70 respectively on which the gripping wheels are fastened. The axles 69 and 70, which cannot be interrupted by couplings, are driven via geared motors 71.

The vertical distance between the upper gripping wheels 50 and 51 respectively and the lower gripping wheels 79 and 80 respectively is designed to be shorter that the distance between the lower guide rail 96 of the upper support pallet 8 and the upper guide rail 97 of the lower support pallet 8a. The pairs of swivel plates 90 and 91 and 92 and 93 respectively carrying the gripping wheels are not only rotatable but are also mounted vertically displaceably on the swivel axles 94 and 95 respectively. As a result, the pairs of gripping wheels 50 and 51 and 79 and 80 respectively can be brought into contact as desired with the guide rails 96 and 97.

In FIG. 6, the gripping wheels are shown in a central inactive position in which they are in contact neither with the guide rail 96 nor with the guide rail 97.

A cushion-type cylinder 98, the end plates 99 and 100 of which are fastened to the upper and lower bracket arms 89 respectively, serves for the vertical drive of the pairs of swivel plates carrying the gripping wheels.

All support pallets 8 and 8a are provided both on the upper side with guide rails 97 and also on the underside with guide rails 96 so that each pallet can be used both as an upper and as a lower pallet. In the illustrative embodiment shown in FIG. 6, the guide rails have a box-shaped profile.

A single cycle of a receiving device 19, as shown in FIG. 6, runs as follows: the spindle-driven cylinder device 53 moves out the holding system 52 with the gripping wheels situated thereon. The gripping wheels move into their raised position and engage the lower guide rail 96 of a loaded pallet. The receiving device then moves upwards a little, until the lower replacement pallet 8a reaches the same level as the upper pallet was previously on, and the replacement pallet is then discharged as an empty pallet, in order to replace the space which has become free with a new pallet. The holding system 52 moved forwards in this operation is then retracted again. The receiving device 19 is then, if necessary in a superposed operation, moved away horizontally and vertically to the depositing space to be aimed for. As soon as the desired position of the receiving device has been reached, the holding system 52 is moved out again by actuation of the spindle-driven cylinder device 53 and the gripping wheels first pull an empty pallet into the lower shelf of the receiving device. If necessary after a short pause, the receiving device is lowered a little until the loaded pallet assumes its specified level. In this position, the loaded pallet is discharged and the holding system is then withdrawn again by a renewed actuation of the spindle-driven cylinder device so that the receiving device can be moved to a new destination.

List of reference symbols
1 Multi-storey car park
Street level
3 Depositing spaces
4 Vehicles
5 Vertical tier
6 Vertical tier
7 Stationary roller rails
8 Transport pallet
8a Replacement transport pallet
9 Lift system
10 Tower-like frame
11 Crab
12 Support rails
13 Roof
14 Support frame
15 Electromotors
16 Guide columns
17 Floor
18 Crosspieces
19 Receiving device
20 Roller rails
21 U-beam
22 Cross webs
30 Support mounting
31 Loose pulley
32 Chain block and tackle system
33 Chains
34 Fastening points
35 Fixed pulley
36 Fixed pulley
37 Drive
38 Electromotor
39 Worm gear
40 Shaft
41 Gearwheel
42 Gearwheel
43 Shaft
44 Chain wheels
45 Tensioning screws
46 Transfer device
47 Transfer device
48 Guide rail
49 Guide part
50 Gripping wheel
51 Gripping wheel
52 Holding system
53 Spindle-driven cylinder device
54 Electromotor
55 Chain drive
56 Cylinder
57 Con-rod
58 I-beam
59 Guide tubes
60 Guide bushes
61 a Guide bushes
62 Hub flange
61a a Hub flange
62 Guide rods
63 Block
64 Axle
65 Upper swivel lever
66 Upper swivel lever
67 Lower swivel lever
68 Lower swivel lever
69 Axle
70 Axle
71 Geared motor
72 Limb
73 Limb
74 Spindle-driven cylinder device
75 Con-rod
76 Roller rails
77 Guide rail
78 Web
79 Gripping wheel
80 Gripping wheel
81 Coupling
82 Coupling
83 Coupling
84 Coupling
85 Rollers
86 Rollers
87 Rollers
88 Support plate
89 Bracket arms
90 Swivel plates
91 Swivel plates
92 Swivel plates
93 Swivel plates
94 Swivel axle
95 Swivel axle
96 Guide rail
97 Guide rail
98 Cushion-type cylinder
99 End plate
100 End plate

We claim:
1. Storing system with a conveying device for conveying heavy objects on movable transport pallets placed in an entry point to depositing spaces arranged in at least one tier above and adjacent to each other and from the respective depositing space to an exit point, with a lift system consisting of at least one tower-like frame which extends over the entire height of the stor- ing system and movable along a horizontal guide, a receiving device arranged in the tower-like frame and movable up and down along a vertical guide located on said tower-like frame, two roller rails, running parallel to each other, arranged on opposite sides in the receiving device and lying perpendicular to the horizontal guide of the tower-like frame, stationary roller rails arranged in the individual depositing spaces and with which the roller rails of the receiving device can be aligned, characterized in that the movable transport pallets (8) for carrying the objects to be stored are guided on the roller rails (20, 7), at least one transfer means (46; 47) including gripping wheels is arranged on the receiving device (19) between the roller rails (20) to move the respective transport pallet during transfer and to secure the transport pallet (8) during the conveying on the receiving device (19), on the underside of each transport pallet (8) approximately centrally and running in its longitudinal direction, a guide rail (48; 96) is fastened, each guide rail including a guide part (49) of which points downwards, and said gripping wheels (50, 51) belonging to the transfer means (46; 47) are arranged on both sides of the guide part (49) are rotatable about respective vertical axes and their circumferences and can be applied against opposite sides of the guide part (49) and moved away from the latter again, and said gripping wheels can be selectively driven and immobilized together.

2. Storing system according to claim 1, characterized in that the gripping wheels (50, 51) are seated on a holding system (52) displaceable in the longitudinal direction of the receiving device (19).

3. Storing system according to claim 2, characterized in that the holding system is displaceable via a spindle-driven cylinder device (53) arranged on the receiving device (19) below the loading surface of the transport pallet (8).

4. Storing system according to claim 3, characterized in that the gripping wheels (50, 51) which lie opposite each other are each mounted on a swivel lever device (65, 67; 66, 68) which is seated on the holding system (52).

5. Storing system according to claim 4, characterized in that the swivel lever devices (65, 67; 66, 68) of the two opposite gripping wheels (50, 51) are connected via two further connecting levers (72, 73) to a double knuckle joint and in that a common locking drive (74) is arranged between the bearing point of the two connecting levers (72, 73) and the holding system (52).

6. Storing system according to claim 5, characterized in that a spindle-driven cylinder device (74) is provided as the locking drive.

7. Storing system according claim 6, characterized in that the gripping wheels (50, 51) are rubber-tired.

8. Storing system according to claim 7, where the depositing spaces are arranged in two opposite vertical planes, characterized in that the receiving device (19) has a separate transfer device (46, 47) for each of the depositing spaces (3) arranged on opposite sides.

9. Storing system according to claim 8, characterized in that a second pair of roller rails (76) for supporting a replacement transport pallet (8a) is arranged on the receiving device (19) at a vertical distance from the roller rails (20).

10. Storing system according to claim 9, characterized in that the transfer means (46; 47) is arranged between the pairs of roller rails (20) arranged above each other and is provided for the selective transfer of one of the two transport pallets (8, 8a).

11. Storing system according to claim 10, characterized in that on the upper side of at least the replacement transport pallet (8a) centrally and parallel to the guide rail (48; 96) provided on the underside, a further guide rail (77; 97) is provided, the guide part (78) of which points upwards, and in that the transfer means (46; 47) has two further, lower-lying gripping wheels (79, 80) which are seated on the same vertical axes (69, 70) as the upper gripping wheels (50, 51) and can be applied against both sides of the upward-facing guide part (78) of the upper guide rail (77; 97) of the respective lower transport pallet (8a).

12. Storing system according to claim 11, characterized in that the gripping wheels (50, 51, 79, 80) may be selectively coupled to and uncoupled from the drivable shafts (69, 70) via couplings (81, 82, 83, 84).

13. Storing system according to claim 11, characterized in that the vertical distance between the upper pair of gripping wheels (50, 51) and the lower pair of gripping wheels (79, 80) is shorter than the vertical distance between the lower guide rail (96) of the upper support pallet (8) and the upper guide rail (97) of the lower support pallet (8a) and in that the swivel lever devices (90, 91 and 92, 93 respectively) on both sides can be raised and lowered to take hold of the respective guide rail (96 and 97 respectively).

14. Storing system according to claim 13, characterized in that the swivel lever devices (90, 91 and 92, 93 respectively) are guided vertically displaceably with the gripping wheels in the holding system (52) and their height can be adjusted by means of a lifting drive.

15. Storing system according to claim 14, characterized in that a cushion-type cylinder (98) is provided as the lifting drive.

16. Storing system according to one of claims 9 to 15, characterized in that the transport pallets (8, 8a) have guide rails (96 and 97 respectively) on both their upper side and on their underside.

17. Storing system according to claim 2, characterized in that the gripping wheels (50, 51) which lie opposite each other are each mounted on a swivel lever device (65, 67; 66, 68) which is seated on the holding system (52).

18. Storing system according to claim 17, characterized in that the swivel lever devices (65, 67; 66, 68) of the two opposite gripping wheels (50, 51) are connected via two further connecting levers (72, 73) to a double knuckle joint and in that a common locking drive (74) is arranged between the bearing point of the two connecting levers (72, 72) and the holding system (52).

19. Storing system according to claim 1, 2, 3, 4, 17 or 18 characterized in that a spindle-driven cylinder device (74) is provided as the locking drive.

20. Storing system according to claims 1, 2, 3, 4, 5, 17 or 18, characterized in that the gripping wheels (50, 51) are rubber-tired.

21. Storing system according to claims 1, 2, 3, 4, 5, 6, 17 or 18, where the depositing spaces are arranged in two opposite vertical planes, characterized in that the receiving device (19) has a separate transfer means (46, 47) for each of the depositing spaces (3) arranged on opposite sides.

22. Storing system according to claim 1, 2, 3, 4, 5, 6, 7, 17 or 18 characterized in that a second pair of roller rails (76) for supporting a replacement transport pallet (8a) is arranged on the receiving device (19) at a vertical distance from the roller rails (20).

23. Storing system according to claim 22, characterized in that the transfer means (46; 47) is arranged between the pairs of roller rails (20) arranged above each other and is provided for the selective transfer of one of the two transport pallets (8, 8a).

24. Storing system according to claim 23, characterized in that on the upper side of at least the lower transport pallet (8a) centrally and parallel to the guide rail (48; 96) provided on the under side, a further guide rail (77; 97) is provided, the guide part (78) of which points upwards, and in that the transfer means (46; 47) has two further, lower-lying gripping wheels (79, 80) which are seated on the same axles (69, 70) as the upper gripping wheels (50, 51) and can be applied against both sides of the upward-facing guide part (78) of the upper guide rail (77; 97) of the respective lower transport pallet (8a).

25. Storing system according to claim 24, characterized in that the gripping wheels (50, 51, 79, 80) may be selectively coupled to and uncoupled from the driveable shafts (69, 70) via couplings (81, 82, 83, 84).

26. Storing system according to claim 25, characterized in that the vertical distance between the upper pair of gripping wheels (50, 51) and the lower pair of gripping wheels (79, 80) is shorter than the vertical distance between the lower guide rail (96) of the upper support pallet (8) and the upper guide rail (97) of the lower support pallet (8a) and in that the swivel lever devices (90, 91 and 92, 93, respectively) on both sides can be raised and lowered to take hold of the respective guide rail (96 and 97 respectively).

27. Storing system according to claim 26, characterized in that the swivel lever devices (90, 91 and 92, 93 respectively) are guided vertically displaceably with the gripping wheels in the holding system (52) and their height can be adjusted by means of a lifting drive.

28. Storing system according to claim 27, characterized in that a cushion-type cylinder (98) is provided as the lifting drive.

29. Storing system according to claim 22, characterized in that the transport pallets (8, 8a) have guide rails (96 and 97 respectively) on both their upper side and on their underside.

30. Storing system according to claim 23, characterized in that the transport pallets (8, 8a) have guide rails (96 and 97 respectively) on both their upper side and on their underside.

31. Storing system according to claim 24, characterized in that the transport pallets (8, 8a) have guide rails (96 and 97 respectively) on both their upper side and on their underside.

32. Storing system according to claim 25, characterized in that the transport pallets (8, 8a) have guide rails (96 and 97 respectively) on both their upper side and on their underside.

33. Storing system according to claim 26, characterized in that the transport pallets (8, 8a) have guide rails (96 and 97 respectively) on both their upper side and on their underside.

34. Storing system according to claim 27, characterized in that the transport pallets (8, 8a) have guide rails (96 and 97 respectively) on both their upper side and on their underside.

35. Storing system according to claim 28, characterized in that the transport pallets (8, 8a) have guide rails (96 and 97 respectively) on both their upper side and on their underside.

* * * * *